(12) United States Patent
Lacombe et al.

(10) Patent No.: US 10,975,170 B2
(45) Date of Patent: Apr. 13, 2021

(54) SOLUTION POLYMERIZATION PROCESS

(71) Applicant: NOVA Chemicals (International) S.A., Fribourg (CH)

(72) Inventors: Yves Lacombe, Calgary (CA); P. Scott Chisholm, Calgary (CA); Stephen Brown, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 309 days.

(21) Appl. No.: 16/216,186

(22) Filed: Dec. 11, 2018

(65) Prior Publication Data

US 2019/0185590 A1  Jun. 20, 2019

(30) Foreign Application Priority Data

Dec. 18, 2017 (CA) .................... CA 2989212

(51) Int. Cl.

| | |
|---|---|
| C08F 2/06 | (2006.01) |
| C08F 2/00 | (2006.01) |
| C08F 2/01 | (2006.01) |
| C08F 4/6592 | (2006.01) |
| C08F 4/659 | (2006.01) |
| C08F 4/02 | (2006.01) |
| C08F 4/12 | (2006.01) |
| C08F 210/16 | (2006.01) |
| B01J 19/18 | (2006.01) |

(52) U.S. Cl.
CPC ............. *C08F 2/06* (2013.01); *B01J 19/1837* (2013.01); *C08F 2/001* (2013.01); *C08F 2/01* (2013.01); *C08F 4/022* (2013.01); *C08F 4/12* (2013.01); *C08F 4/6592* (2013.01); *C08F 4/65912* (2013.01); *C08F 210/16* (2013.01); *B01J 2219/00038* (2013.01); *B01J 2219/00121* (2013.01); *C08F 4/65908* (2013.01); *C08F 2410/02* (2013.01); *C08F 2420/04* (2013.01)

(58) Field of Classification Search
CPC .......... C08F 2/001; C08F 2/01; B01J 19/1837
See application file for complete search history.

(56) References Cited

U.S. PATENT DOCUMENTS

| | | | |
|---|---|---|---|
| 4,105,609 A | 8/1978 | Machon et al. | |
| 4,379,882 A | 4/1983 | Miyata | |
| 4,731,438 A | 3/1988 | Bernier | |
| 4,803,259 A | 2/1989 | Zboril et al. | |
| 5,206,075 A | 4/1993 | Hodgson, Jr. | |
| 6,180,730 B1 | 1/2001 | Sibtain et al. | |
| 2018/0037727 A1* | 2/2018 | Karjala | ............... B01J 19/2455 |

OTHER PUBLICATIONS

Wild, L.; Ryle, T.R.; Knobelock, D.C. and Peat, I.R.; Determination of Branching Distributions in Polyethylene and Ethylene Copolymers; Journal of Polymer Science: Polymer Physics Edition, vol. 20, (1982), pp. 441-455.

* cited by examiner

*Primary Examiner* — Catherine S Branch
(74) *Attorney, Agent, or Firm* — Thomas J. Styslinger

(57) ABSTRACT

A solution polymerization process uses a reactor system in which a first stage is operated in a non adiabatic (cooled) manner and is connected to a second stage containing a downstream reactor that is operated adiabatically. In an embodiment, the first reactor stage includes at least one loop reactor and the second stage includes a tubular reactor. In an embodiment, the first stage is operated with a single site catalyst and at least one downstream reactor uses a Ziegler Natta catalyst.

15 Claims, 3 Drawing Sheets

SOLUTION POLYMERIZATION PROCESS

This disclosure to the polymerization of ethylene under solution polymerization conditions.

A typical solution polymerization process is operated with a reactor that operates in an adiabatic manner, so that the enthalpy of polymerization heats the reactor contents. The reaction temperature is thus established by the temperature of the reactor feedstreams and the amount of monomer that is "converted" to polymer in the reaction.

An alternate approach to achieve higher polymer concentration is to operate the reactor in a non-adiabatic way. A non-adiabatic reactor system (i.e. a reactor that is equipped with a heat exchanger to remove some of the enthalpy of reaction) enables the operation of the reactor at higher monomer concentrations for a given reactor temperature and polymer type. Operating the reactor in this manner allows the monomer concentration to be decoupled from the reactor temperature and this provides more degrees of freedom to adjust process conditions to achieve the desired polymer architecture. Stated alternatively, the use of a cooled reactor allows higher polymer concentrations to be achieved at a given reaction temperature.

In one embodiment, provided herein is:
a multistage process for the solution polymerization of ethylene, said process including
I) a first stage polymerization conducted in at least one non adiabatic and mixed reactor in the presence of a first catalyst system; and
II) a second stage polymerization conducted in at least one adiabatic reactor and in
the presence of a second catalyst system that is different from said first catalyst system, wherein said second stage polymerization is in series with, and downstream from, said first stage polymerization.

In an embodiment, said first stage polymerization is conducted in two cooled mixed loop reactors with the further proviso that said second stage polymerization is conducted in the presence of polymer solutions which are discharged from both of said two cooled loop reactors.

In an embodiment, said second stage polymerization is conducted in 1) a stirred reactor that is immediately downstream of said first stage and 2) a tubular reactor that is downstream of said stirred reactor.

DEFINITION OF TERMS

Figure 1:
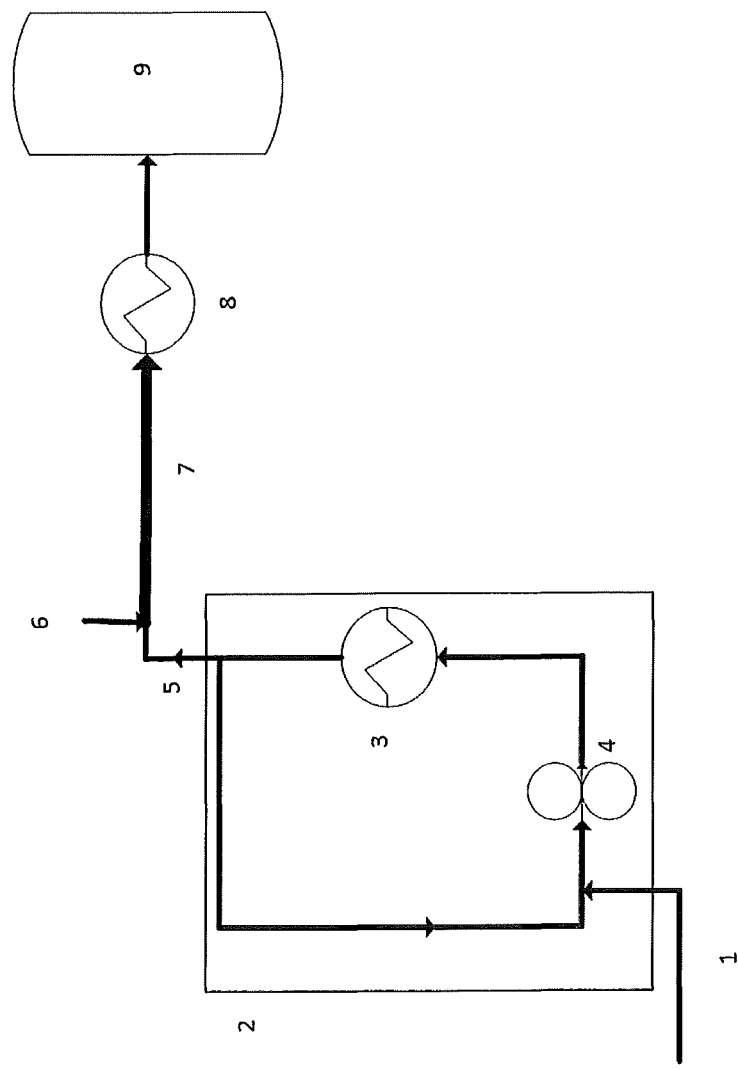
FIG. 1 provides a schematic process flow diagram.

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure, the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain.

As used herein, the term "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. Common ethylene polymers include high density polyethylene (HDPE), medium density polyethylene (MDPE), linear low density polyethylene (LLDPE), very low density polyethylene (VLDPE), ultralow density polyethylene (ULDPE), plastomer and elastomers. The term ethylene polymer also includes polymers produced in a high pressure polymerization processes; non-limiting examples include low density polyethylene (LDPE), ethylene vinyl acetate copolymers (EVA), ethylene alkyl acrylate copolymers, ethylene acrylic acid copolymers and metal salts of ethylene acrylic acid (commonly referred to as ionomers). The term ethylene polymer also includes block copolymers which may include 2 to 4 comonomers. The term ethylene polymer also includes combinations of, or blends of, the ethylene polymers described above.

The term "ethylene interpolymer" refers to a subset of polymers within the "ethylene polymer" group that excludes polymers produced in high pressure polymerization processes; non-limiting examples of polymers produced in high pressure processes include LDPE and EVA (the latter is a copolymer of ethylene and vinyl acetate).

The term "heterogeneous ethylene interpolymers" refers to a subset of polymers in the ethylene interpolymer group that are produced using a heterogeneous catalyst formulation; non-limiting examples of which include Ziegler-Natta or chromium catalysts.

The term "homogeneous ethylene interpolymer" refers to a subset of polymers in the ethylene interpolymer group that are produced using metallocene or single-site catalysts. Typically, homogeneous ethylene interpolymers have narrow molecular weight distributions, for example gel permeation chromatography (GPC) $M_w/M_n$ values of less than 2.8; $M_w$ and $M_n$ refer to weight and number average molecular weights, respectively. In contrast, the $M_w/M_n$ of heterogeneous ethylene interpolymers are typically greater than the $M_w/M_n$ of homogeneous ethylene interpolymers. In general, homogeneous ethylene interpolymers also have a narrow comonomer distribution, i.e. each macromolecule within the molecular weight distribution has a similar comonomer content. Frequently, the composition distribution breadth index "CDBI" is used to quantify how the comonomer is distributed within an ethylene interpolymer, as well as to differentiate ethylene interpolymers produced with different catalysts or processes. The "$CDBI_{50}$" is defined as the percent of ethylene interpolymer whose composition is within 50% of the median comonomer composition; this definition is consistent with that described in U.S. Pat. No. 5,206,075 assigned to Exxon Chemical Patents Inc. The $CDBI_{50}$ of an ethylene interpolymer can be calculated from TREF curves (Temperature Rising Elution Fractionation); the TREF method is described in Wild, et al., J. Polym. Sci., Part B, Polym. Phys., Vol. 20 (3), pages 441-455. Typically the $CDBI_{50}$ of homogeneous ethylene interpolymers are greater than about 70%. In contrast, the $CDBI_{50}$ of α-olefin containing heterogeneous ethylene interpolymers are generally lower than the $CDBI_{50}$ of homogeneous ethylene interpolymers.

It is well known to those skilled in the art, that homogeneous ethylene interpolymers are frequently further subdivided into "linear homogeneous ethylene interpolymers" and "substantially linear homogeneous ethylene interpolymers". These two subgroups differ in the amount of long chain branching: more specifically, linear homogeneous ethylene interpolymers have less than about 0.01 long chain branches per 1000 carbon atoms; while substantially linear homogeneous ethylene interpolymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneous ethylene interpolymer" refers to both linear homogeneous ethylene interpolymers and substantially linear homogeneous ethylene interpolymers.

Herein, the term "polyolefin" includes ethylene polymers and propylene polymers; non-limiting examples of propylene polymers include isotactic, syndiotactic and atactic propylene homopolymers, random propylene copolymers containing at least one comonomer and impact polypropylene copolymers or heterophasic polypropylene copolymers.

The term "thermoplastic" refers to a polymer that becomes liquid when heated, will flow under pressure and solidify when cooled. Thermoplastic polymers include ethylene polymers as well as other polymers commonly used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein, the terms "hydrocarbyl", "hydrocarbyl radical" or "hydrocarbyl group" refers to linear or cyclic, aliphatic, olefinic, acetylenic and aryl (aromatic) radicals including hydrogen and carbon that are deficient by one hydrogen.

As used herein, an "alkyl radical" includes linear, branched and cyclic paraffin radicals that are deficient by one hydrogen radical; non-limiting examples include methyl ($-CH_3$) and ethyl ($-CH_2CH_3$) radicals. The term "alkenyl radical" refers to linear, branched and cyclic hydrocarbons containing at least one carbon-carbon double bond that is deficient by one hydrogen radical.

Herein the term "R1" and its superscript form "$^{R1}$" refers to a first reactor in a continuous solution polymerization process; it being understood that R1 is distinctly different from the symbol $R^1$; the latter is used in chemical formula, e.g. representing a hydrocarbyl group. Similarly, the term "R2" and it's superscript form "$^{R2}$" refers to a second reactor, and; the term "R3" and it's superscript form "$^{R3}$" refers to a third reactor.

Disclosed herein are combinations of non-adiabatic and adiabatic reactors to achieve higher polymer concentration and higher reactor outlet temperature. In some embodiments this includes a reactor system for a continuous polymerization process where a non-adiabatic reactor stage is followed by an adiabatic reactor stage. FIG. 1 provides a schematic of one embodiment of this system.

A feed system 1 is used to provide solvent, ethylene, a first catalyst system, and (optionally) one or more additional alpha olefins and (optionally) hydrogen to a first stage reactor system 2. The first stage reactor system 2 is equipped with one or multiple heat exchangers 3 and a pump 4 to recycle some of the reactor flow. The first reactor stage 2 is operated in a non adiabatic manner. More specifically, heat is removed from first reactor stage 2 via heat exchanger 3 to allow a higher polymer concentration within reactor system 2 at a given reaction temperature (in comparison to a reactor system that is operated in an adiabatic manner. The polymer solution from reactor system 2 is then transferred to adiabatic reactor 7 via transfer line 5. Thus, the first stage polymerization is "in series" with the second stage polymerization and the second stage polymerization is "downstream from" the first stage polymerization in the sense that the first reactor system 2 is connected to the adiabatic reactor 7 in a manner that allows the flow of the polymer solution from the first reactor system 2 to the adiabatic reactor 7 via the transfer line 5. A second catalyst is added via feed system 6. In some embodiments, the second catalyst system is different from the first catalyst system. Additional monomer(s); solvent; and hydrogen may also be added via feed system 6. In an embodiment, the polymer solution from the adiabatic reactor 7 is heated in heater 8 before the polymer is separated from the solution and finished in finishing system 9.

Reactor Systems

In an embodiment, the overall reactor system includes i) a first stage polymerization that utilizes a non-adiabatic loop reactor followed by a second stage polymerization that uses an adiabatic tubular reactor. The tubular reactor may be operated in a "trimmer" mode (i.e. no additional feeds) or with additional catalyst and or additional monomer(s) feed.

In another embodiment, the reactor system includes two non-adiabatic loop reactors in the first stage followed by a second stage using an adiabatic tubular reactor, where the tubular reactor may be operated in a trimmer mode (i.e. no additional feeds) or with additional catalyst and or additional monomer(s) feeds where the two non-adiabatic reactor are operated in series and make the same or similar polymer (i.e. the molecular weight and comonomer catalyst of the polymer made in each non adiabatic reactor is similar (for example within about 10%)).

In another embodiment, the reactor system includes a first stage including two non-adiabatic loop reactors operated in parallel followed by a second stage in which an adiabatic tubular reactor receives polymer solution from both of the non adiabatic reactors.

In another embodiment, the reactor system includes one non-adiabatic loop reactor followed by a second stage using two adiabatic reactors. In this embodiment, the first reactor in the second stage is an adiabatic loop reactor where mixing is achieved through static mixers and a recirculation pump or a stirred reactor and the third reactor is an adiabatic tubular reactor.

In some embodiments, the first stage polymerization is operated in a non adiabatic (cooled) manner. In an embodiment, the amount of heat removal is from 0.05 to 0.6 kilowatts per kilogram of polymer produced (0.05 to 0.6 kw/kg).

Catalysts

Organometallic catalyst formulations that are efficient in polymerizing olefins are well known in the art. At least two catalyst formulations are employed in the present process. One of the catalyst formulations is a single-site catalyst formulation that produces a first ethylene interpolymer. The other catalyst formulation is a heterogeneous catalyst formulation that produces a second ethylene interpolymer. Optionally a third ethylene interpolymer is produced using the heterogeneous catalyst formulation that was used to produce the second ethylene interpolymer, or a different heterogeneous catalyst formulation may be used to produce the third ethylene interpolymer. In the continuous solution process, the at least one homogeneous ethylene interpolymer and the at least one heterogeneous ethylene interpolymer are solution blended and an ethylene interpolymer product is produced.

Single Site Catalyst Formulation

The catalyst components which make up the single site catalyst formulation are not particularly limited, i.e. a wide variety of catalyst components can be used. One non-limiting embodiment of a single site catalyst formulation includes the following three or four components: a bulky ligand-metal complex; an alumoxane co-catalyst; an ionic activator and optionally a hindered phenol. In this disclosure: "(i)" refers to the amount of "component (i)", i.e. the bulky ligand-metal complex added to R1; "(ii)" refers to "component (ii)", i.e. the alumoxane co-catalyst; "(iii)" refers to "component (iii)" i.e. the ionic activator, and; "(iv)" refers to "component (iv)", i.e. the optional hindered phenol.

Non-limiting examples of component (i) are represented by formula (I):

$$(L^A)_a M(PI)_b (Q)_n \qquad (I)$$

wherein ($L^A$) represents a bulky ligand; M represents a metal atom; PI represents a phosphinimine ligand; Q represents a leaving group; a is 0 or 1; b is 1 or 2; (a+b)=2; n is 1 or 2, and; the sum of (a+b+n) equals the valance of the metal M.

Non-limiting examples of the bulky ligand $L^A$ in formula (I) include unsubstituted or substituted cyclopentadienyl ligands or cyclopentadienyl-type ligands, heteroatom substituted and/or heteroatom containing cyclopentadienyl-type ligands. Additional non-limiting examples include, cyclo-pentaphenanthreneyl ligands, unsubstituted or substituted indenyl ligands, benzindenyl ligands, unsubstituted or substituted fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine, pyrrolyl ligands, pyrozolyl ligands, carbazolyl ligands, borabenzene ligands and the like, including hydrogenated versions thereof, for example tetrahydroindenyl ligands. In other embodiments, $L^A$ may be any other ligand structure capable of $\eta$-bonding to the metal M, such embodiments include both $\eta^3$-bonding and $\eta^5$-bonding to the metal M. In other embodiments, $L^A$ may includes one or more heteroatoms, for example, nitrogen, silicon, boron, germanium, sulfur and phosphorous, in combination with carbon atoms to form an open, acyclic, or a fused ring, or ring system, for example, a heterocyclopentadienyl ancillary ligand. Other non-limiting embodiments for $L^A$ include bulky amides, phosphides, alkoxides, aryloxides, imides, carbolides, borollides, porphyrins, phthalocyanines, corrins and other polyazomacrocycles.

Non-limiting examples of metal M in formula (I) include Group 4 metals, titanium, zirconium and hafnium.

The phosphinimine ligand, PI, is defined by formula (II):

$$(R^P)_3 P=N- \qquad (II)$$

wherein the $R^P$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula $-Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula $-Ge(R^G)_3$, wherein the $R^G$ groups are defined as $R^s$ is defined in this paragraph.

The leaving group Q is any ligand that can be abstracted from formula (I) forming a catalyst species capable of polymerizing one or more olefin(s). An equivalent term for Q is an "activatable ligand", i.e. equivalent to the term "leaving group". In some embodiments, Q is a monoanionic labile ligand having a sigma bond to M. Depending on the oxidation state of the metal, the value for n is 1 or 2 such that formula (I) represents a neutral bulky ligand-metal complex. Non-limiting examples of Q ligands include a hydrogen atom, halogens, $C_{1-20}$ hydrocarbyl radicals, $C_{1-20}$ alkoxy radicals, $C_{5-10}$ aryl oxide radicals; these radicals may be linear, branched or cyclic or further substituted by halogen atoms, alkyl radicals, alkoxy radicals, $C_{6-10}$ arly or aryloxy radicals. Further non-limiting examples of Q ligands include weak bases such as amines, phosphines, ethers, carboxylates, dienes, hydrocarbyl radicals having from 1 to 20 carbon atoms. In another embodiment, two Q ligands may form part of a fused ring or ring system.

Further embodiments of component (i) of the single site catalyst formulation include structural, optical or enantiomeric isomers (meso and racemic isomers) and mixtures thereof of the bulky ligand-metal complexes described in formula (I) above.

The second single site catalyst component, component (ii), is an alumoxane co-catalyst that activates component (i) to a cationic complex. An equivalent term for "alumoxane" is "aluminoxane"; although the exact structure of this co-catalyst is uncertain, subject matter experts generally agree that it is an oligomeric species that contain repeating units of the general formula (III):

$$(R)_2 AlO-(Al(R)-O)_n-Al(R)_2 \qquad (III)$$

where the R groups may be the same or different linear, branched or cyclic hydrocarbyl radicals containing 1 to 20 carbon atoms and n is from 0 to about 50. A non-limiting example of an alumoxane is methyl aluminoxane (or MAO) wherein each R group in formula (III) is a methyl radical.

The third catalyst component (iii) of the single site catalyst formation is an ionic activator. In general, ionic activators include a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas (IV) and (V) shown below;

$$[R^5]^+[B(R^7)_4]^-  \qquad (IV)$$

where B represents a boron atom, $R^5$ is an aromatic hydrocarbyl (e.g. triphenyl methyl cation) and each $R^7$ is independently chosen from phenyl radicals which are unsubstituted or substituted with from 3 to 5 substituents chosen from fluorine atoms, $C_{1-4}$ alkyl or alkoxy radicals which are unsubstituted or substituted by fluorine atoms; and a silyl radical of formula $—Si(R^9)_3$, where each $R^9$ is independently chosen from hydrogen atoms and $C_{1-4}$ alkyl radicals, and; compounds of formula (V);

$$[(R^8)_tZH]^+[B(R^7)_4]^-  \qquad (V)$$

where B is a boron atom, H is a hydrogen atom, Z is a nitrogen or phosphorus atom, t is 2 or 3 and $R^8$ is chosen from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above in formula (IV).

In both formula (IV) and (V), a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl) boron, tripropylammonium tetra(phenyl)boron, tri(n-butyl) ammonium tetra(phenyl)boron, trimethylammonium tetra (p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

The optional fourth catalyst component of the single site catalyst formation is a hindered phenol, component (iv). Non-limiting example of hindered phenols include butylated phenolic antioxidants, butylated hydroxytoluene, 2,4-di-tertiarybutyl-6-ethyl phenol, 4,4'-methylenebis (2,6-di-tertiarybutylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst formulation the quantity and mole ratios of the three or four components, (i) through (iv) are optimized using conventional techniques that are well known to those skilled in the art.

Heterogeneous Catalyst Formulations

A number of heterogeneous catalyst formulations are well known to those skilled in the art, including, as non-limiting examples, Ziegler-Natta and chromium catalyst formulations.

Two types of Ziegler-Natta catalysts are especially suitable, namely "in-line" and "batch" Ziegler-Natta catalyst formulations. The term "in-line Ziegler-Natta catalyst formulation" refers to the continuous synthesis of a small quantity of active Ziegler-Natta catalyst and immediately injecting this catalyst into at least one continuously operating reactor, where the catalyst polymerizes ethylene and one or more optional α-olefins to form an ethylene interpolymer. The terms "batch Ziegler-Natta catalyst formulation" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst formulation, or batch Ziegler-Natta procatalyst, is transferred to a catalyst storage tank. The term "procatalyst" refers to an inactive catalyst formulation (inactive with respect to ethylene polymerization); the procatalyst is converted into an active catalyst by adding an alkyl aluminum co-catalyst. As needed, the procatalyst is pumped from the storage tank to at least one continuously operating reactor, where an active catalyst is formed and polymerizes ethylene and one or more optional α-olefins to form an ethylene interpolymer. The procatalyst may be converted into an active catalyst in the reactor or external to the reactor.

A wide variety of chemical compounds can be used to synthesize an active Ziegler-Natta catalyst formulation. The following describes various chemical compounds that may be combined to produce an active Ziegler-Natta catalyst formulation. Those skilled in the art will understand that the embodiments in this disclosure are not limited to the specific chemical compound disclosed.

An active Ziegler-Natta catalyst formulation may be formed from: a magnesium compound, a chloride compound, a metal compound, an alkyl aluminum co-catalyst and an aluminum alkyl. In this disclosure: "(v)" refers to "component (v)" the magnesium compound; the term "(vi)" refers to the "component (vi)" the chloride compound; "(vii)" refers to "component (vii)" the metal compound; "(viii)" refers to "component (viii)" alkyl aluminum co-catalyst, and; "(ix)" refers to "component (ix)" the aluminum alkyl. As will be appreciated by those skilled in the art, Ziegler-Natta catalyst formulations may contain additional components; a non-limiting example of an additional component is an electron donor, e.g. amines or ethers.

A non-limiting example of an active in-line Ziegler-Natta catalyst formulation can be prepared as follows. In the first step, a solution of a magnesium compound (component (v)) is reacted with a solution of the chloride compound (component (vi)) to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl (component (ix)). Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound (component (vii)) is added to the solution of magnesium chloride and the metal compound is supported on the magnesium chloride. Non-limiting examples of suitable metal compounds include $M(X)_n$ or $MO(X)_n$; where M represents a metal chosen from Group 4 through Group 8 of the Periodic Table, or mixtures of metals chosen from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst (component (viii)) is added to the metal compound supported on the magnesium chloride. A wide variety of alkyl aluminum co-catalysts are suitable, as expressed by formula (VI):

$$Al(R^4)_p(OR^5)_q(X)_r \quad\quad (VI)$$

wherein the $R^4$ groups may be the same or different, hydrocarbyl groups having from 1 to 10 carbon atoms; the $OR^5$ groups may be the same or different, alkoxy or aryloxy groups wherein $R^5$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line Ziegler-Natta catalyst formulation, can be carried out in a variety of solvents; non-limiting examples of solvents include linear or branched $C_5$ to $C_{12}$ alkanes or mixtures thereof. To produce an active in-line Ziegler-Natta catalyst formulation the quantity and mole ratios of the five components, (v) through (ix), are optimized using conventional techniques that are well known to those skilled in the art.

Additional embodiments of heterogeneous catalyst formulations include formulations where the "metal compound" is a chromium compound; non-limiting examples include silyl chromate, chromium oxide and chromocene. In some embodiments, the chromium compound is supported on a metal oxide such as silica or alumina. Heterogeneous catalyst formulations containing chromium may also include co-catalysts; non-limiting examples of co-catalysts include trialkylaluminum, alkylaluminoxane and dialkoxyalkylaluminum compounds and the like.

A simple, non limiting embodiment uses a single, non adiabatic reactor (R1) which is cooled and uses a first catalyst system. R1 is connected in series to a second reactor (R2) which is operated adiabatically and uses a different catalyst system.

In this embodiment, feeds (solvent, ethylene, at least two catalyst formulations, optional hydrogen and optional α-olefin) are fed to at least two reactor continuously. A single site catalyst formulation is injected into R1 and a first heterogeneous catalyst formation is injected into R2. The single site catalyst formulation includes an ionic activator (component (iii)), a bulky ligand-metal complex (component (i)), an alumoxane co-catalyst (component (ii)) and an optional hindered phenol (component (iv)), respectively.

R1 and R2 are operated in series mode in this embodiment. To be more clear, in series mode 100% of the effluent from R1 flows directly into R2. (In parallel mode, R1 and R2 operate independently and the effluents from R1 and R2 are combined downstream of the reactors).

A heterogeneous catalyst formulation is injected into R2. In one embodiment a first in-line Ziegler-Natta catalyst formulation is injected into R2. A first in-line Ziegler-Natta catalyst formation is formed within a first heterogeneous catalyst assembly by optimizing the following molar ratios: (aluminum alkyl)/(magnesium compound) or (ix)/(v); (chloride compound)/(magnesium compound) or (vi)/(v); (alkyl aluminum co-catalyst)/(metal compound) or (viii)/(vii), and; (aluminum alkyl)/(metal compound) or (ix)/(vii); as well as the time these compounds have to react and equilibrate. Within the first heterogeneous catalyst assembly the time between the addition of the chloride compound and the addition of the metal compound (component (vii)) is controlled; hereafter HUT-1 (the first Hold-Up-Time). The time between the addition of component (vii) and the addition of the alkyl aluminum co-catalyst, component (viii), is also controlled; hereafter HUT-2 (the second Hold-Up-Time). In addition, the time between the addition of the alkyl aluminum co-catalyst and the injection of the in-line Ziegler-Natta catalyst formulation into R2 is controlled; hereafter HUT-3 (the third Hold-Up-Time). Optionally, 100% the alkyl aluminum co-catalyst, may be injected directly into R2. Optionally, a portion of the alkyl aluminum co-catalyst may be injected into the first heterogeneous catalyst assembly and the remaining portion injected directly into R2. Injection of the in-line heterogeneous catalyst formulation into R2 produces a second ethylene interpolymer in a second exit stream (exiting R2). Optionally the second exit stream is deactivated by adding a catalyst deactivator. If the second exit stream is not deactivated the second exit stream enters (optional) reactor R3. One embodiment of a suitable R3 design is a tubular reactor. Optionally, one or more of the following fresh feeds may be injected into R3; solvent, ethylene, hydrogen, α-olefin and a first or second heterogeneous catalyst formulation; the latter is supplied from a second heterogeneous catalyst assembly. The chemical composition of the first and second heterogeneous catalyst formulations may be the same, or different, i.e. the catalyst components ((v) through (ix)), mole ratios and hold-up-times may differ in the first and second heterogeneous catalyst assemblies. The second heterogeneous catalyst system generates an efficient catalyst by optimizing hold-uptimes and the molar ratios of the catalyst components using conventional optimization techniques.

Optional Reactor R3 may be operated in several different manners. Non-limiting examples of operational modes include: (a) residual ethylene, residual optional α-olefin and residual active catalyst entering R3 react to form the third ethylene interpolymer, or; (b) fresh process solvent, fresh ethylene and optionally fresh α-olefin are added to R3 and the residual active catalyst entering R3 forms the third ethylene interpolymer, or; (c) a second in-line heterogeneous catalyst formulation is added to R3 to polymerize residual ethylene and residual optional α-olefin to form the third ethylene interpolymer, or; (d) fresh process solvent, ethylene, optional α-olefin and a second in-line heterogeneous catalyst formulation are added to R3 to form the third ethylene interpolymer. In this embodiment, R3 is part of the "second stage polymerization" and is operated adiabatically.

A catalyst deactivator may be added to the exit stream of R3, thereby producing a deactivated solution.

The deactivated solution passes through a pressure let down device, a heat exchanger and a passivator is added forming a passivated solution. The passivated solution passes through a series of vapor liquid separators and ultimately the ethylene interpolymer product enters polymer recovery. Non-limiting examples of polymer recovery operations include one or more gear pump, single screw extruder or twin screw extruder that forces the molten ethylene interpolymer product through a pelletizer.

Embodiments of the manufactured articles disclosed herein, may also be formed from ethylene interpolymer products synthesized using a batch Ziegler-Natta catalyst. Typically, a first batch Ziegler-Natta procatalyst is injected into R2 and the procatalyst is activated within R2 by injecting an alkyl aluminum co-catalyst forming a first batch Ziegler-Natta catalyst. Optionally, a second batch Ziegler-Natta procatalyst is injected into R3.

Additional Solution Polymerization Process Parameters

A variety of solvents may be used as the process solvent; non-limiting examples include linear, branched or cyclic $C_5$ to $C_{12}$ alkanes. Non-limiting examples of α-olefins include $C_3$ to $C_{10}$ α-olefins. It is well known to individuals of ordinary experience in the art that reactor feed streams (solvent, monomer, α-olefin, hydrogen, catalyst formulation etc.) are preferably free of catalyst deactivating poisons; non-limiting examples of poisons include trace amounts of oxygenates such as water, fatty acids, alcohols, ketones and aldehydes. Such poisons are removed from reactor feed streams using standard purification practices; non-limiting examples include molecular sieve beds, alumina beds and oxygen removal catalysts for the purification of solvents, ethylene and α-olefins, etc.

In operating the continuous solution polymerization process total amount of ethylene supplied to the process can be portioned or split between the reactors. The ethylene concentration in each reactor is also controlled. The R1 ethylene concentration is defined as the weight of ethylene in reactor 1 divided by the total weight of everything added to reactor 1; the R2 ethylene concentration (wt %) and R3 ethylene concentration (wt %) are defined similarly. The total amount of ethylene converted in each reactor is monitored. The term "$Q^{R1}$" refers to the percent of the ethylene added to R1 that is converted into an ethylene interpolymer by the catalyst formulation. Similarly $Q^{R2}$ and $Q^{R3}$ represent the percent of the ethylene added to R2 and R3 that was converted into ethylene interpolymer, in the respective reactor. The term "$Q^T$" represents the total or overall ethylene conversion across the entire continuous solution polymerization plant; i.e. $Q^T=100\times$[weight of ethylene in the interpolymer product]/([weight of ethylene in the interpolymer product]+[weight of unreacted ethylene]). Optionally, α-olefin may be added to the continuous solution polymerization process. If added, α-olefin may be proportioned or split between R1, R2 and R3. This operational variable is referred to as the Comonomer Split (CS), i.e. "$CS^{R1}$", "$CS^{R2}$" and "$CS^{R3}$" refer to the weight percent of α-olefin comonomer that is injected in R1, R2 and R3, respectively; with the proviso that $CS^{R1}+CS^{R2}+CS^{R3}=100\%$.

In the continuous polymerization processes described, polymerization is terminated by adding a catalyst deactivator. The catalyst deactivator deactivates the polymerization reaction by changing active catalyst species to inactive forms. Suitable deactivators are well known in the art, non-limiting examples include: amines (e.g. U.S. Pat. No. 4,803,259 to Zboril et al.); alkali or alkaline earth metal salts of carboxylic acid (e.g. U.S. Pat. No. 4,105,609 to Machan et al.); water (e.g. U.S. Pat. No. 4,731,438 to Bernier et al.); hydrotalcites, alcohols and carboxylic acids (e.g. U.S. Pat. No. 4,379,882 to Miyata); or a combination thereof (U.S. Pat. No. 6,180,730 to Sibtain et al.).

Prior to entering the vapor/liquid separator, a passivator or acid scavenger is added to deactivated solution. Suitable passivators are well known in the art, non-limiting examples include alkali or alkaline earth metal salts of carboxylic acids or hydrotalcites.

In this disclosure, the number of solution reactors is not particularly important; with the proviso that the continuous solution polymerization process includes at least two reactors in series with a non adiabatic (cooled) reactor being operated upstream of a non adiabatic reactor.

Ethylene Interpolymer Product

The upper limit on the density of the ethylene interpolymer product may be about 0.975 g/cm$^3$; in some cases about 0.965 g/cm$^3$ and; in other cases about 0.955 g/cm$^3$. The lower limit on the density of the ethylene interpolymer product may be about 0.869 g/cm$^3$, in some cases about 0.879 g/cm$^3$, and; in other cases about 0.889 g/cm$^3$.

The upper limit on the CDBI$_{50}$ of the ethylene interpolymer product may be about 97%, in other cases about 90% and in still other cases about 85%. An ethylene interpolymer product with a CDBI$_{50}$ of 97% may result if an α-olefin is not added to the continuous solution polymerization process; in this case, the ethylene interpolymer product is an ethylene homopolymer. The lower limit on the CDBI$_{50}$ of an ethylene interpolymer may be about 20%, in other cases about 40% and in still other cases about 60%.

The upper limit on the $M_w/M_n$ of the ethylene interpolymer product may be about 25, in other cases about 15 and in still other cases about 9. The lower limit on the $M_w/M_n$ of the ethylene interpolymer product may be 2.0, in other cases about 2.2 and in still other cases about 2.4.

Flexible Manufactured Articles

The ethylene interpolymer products produced according to this disclosure are well suited to manufacture a wide variety of articles. Non-limiting examples include monolayer or multilayer films, such films are well known to those of ordinary experienced in the art. Non-limiting examples of processes to prepare such films include blown film and cast film processes.

Depending on the end-use application, the disclosed ethylene interpolymer products may be converted into films that span a wide range of thicknesses. Non-limiting examples include, food packaging films where thicknesses may range from about 0.5 mil (13 μm) to about 4 mil (102

μm), and; in heavy duty sack applications film thickness may range from about 2 mil (51 μm) to about 10 mil (254 μm).

The ethylene interpolymer products may also be used in one or more layers of a multilayer film; non-limiting examples of multilayer films include three, five, seven, nine, eleven or more layers. The thickness of a specific layer (containing an ethylene interpolymer product having improved color) within a multilayer film may be about 5%, in other cases about 15% and in still other cases about 30% of the total multilayer film thickness. In other embodiments, the thickness of a specific layer (containing the ethylene interpolymer product having improved color) within a multilayer film may be about 95%, in other cases about 80% and in still other cases about 65% of the total multilayer film thickness. Each individual layer of a multilayer film may contain more than one ethylene interpolymer product and/or additional thermoplastics.

Additional embodiments include laminations and coatings, wherein mono or multilayer films containing the disclosed ethylene interpolymer products are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art.

In flexible applications there is a need to improve the melt strength of ethylene interpolymer products. The following are non-limiting examples. The rate at which blown film can be produced is frequently limited by bubble instability; higher melt strength ethylene interpolymer products have improved bubble stability which allows blown film production rates to be increased. Higher melt strength is also desired in thermoforming applications, where a film or sheet including an ethylene interpolymer product is heated and deformed by gravity (or gravity plus vacuum) into a mold, e.g. a tray or cup-like mold. Higher melt strength ethylene interpolymer products are also desired in foam applications, e.g. higher melt strengths are advantageous in producing lower density foams using chemical or physical blowing agents. Ethylene interpolymer products having higher heat deflection temperatures are desired in film applications; e.g. in the packaging of hot foods, or the cooking of foods within a film including a least one layer of an ethylene interpolymer product having a higher heat deflection temperature.

The ethylene interpolymer products can be used in a wide range of flexible manufactured articles, e.g. articles that includes one or more films (monolayer or multilayer). In film applications, the ethylene interpolymer products are useful in food packaging applications. More specifically, the food packaging industry has a need for improved ethylene interpolymer products that can be converted into packaging films that have improved (reduced) water vapor transmission rate (WVTR). Low WVTR packaging film ensures that crackers are crispy when opened by the consumer; in addition, low WVTR films ensure that the packaged food has an acceptable shelf-life. The ethylene interpolymer products, may also be blended with nucleating agents. The term "nucleating agent" refers to any material that effectively accelerates the phase change from a molten ethylene interpolymer product to a solid semi-crystalline ethylene interpolymer product. Nucleating agents are frequently effective in reducing the WVTR of barrier films. Additional non-limiting examples where the disclosed ethylene interpolymers are useful in flexible manufactured articles include: fresh and frozen food packaging (including liquids, gels or solids), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles including one or more films containing at least one ethylene interpolymer product having improved color include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) including at least one embodiment of the disclosed ethylene interpolymer products.

Desired film physical properties (monolayer or multilayer) typically depend on the application of interest. Non-limiting examples of desirable film properties include: barrier properties (e.g. reducing water and oxygen transmission), optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

Rigid Manufactured Articles

Additional non-limiting applications where the ethylene interpolymer may be used include: deli containers, margarine tubs, trays, cups, lids, bottles, bottle cap liners, pails, crates, drums, bumpers, industrial bulk containers, industrial vessels, material handling containers, playground equipment, recreational equipment, safety equipment, wire and cable applications (power cables, communication cables and conduits), tubing and hoses, pipe applications (pressure pipe and non-pressure pipe, e.g. natural gas distribution, water mains, interior plumbing, storm sewer, sanitary sewer, corrugated pipes and conduit), foamed articles (foamed sheet or bun foam), military packaging (equipment and ready meals), personal care packaging (diapers and sanitary products), cosmetic, pharmaceutical and medical packaging, truck bed liners, pallets and automotive dunnage.

Additives and Adjuvants

The ethylene interpolymer products and the manufactured articles described above may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof. Non-limiting examples of suitable primary antioxidants include Irganox 1010 [CAS Reg. No. 6683-19-8] and Irganox 1076 [CAS Reg. No. 2082-79-3]; both available from BASF Corporation, Florham Park, N.J., U.S.A. Non-limiting examples of suitable secondary antioxidants include Irgafos 168 [CAS Reg. No. 31570-04-4], available from BASF Corporation, Florham Park, N.J., U.S.A.; Weston 705 [CAS Reg. No. 939402-02-5], available from Addivant, Danbury Conn., U.S.A. and; Doverphos Igp-11 [CAS Reg. No. 1227937-46-3] available form Dover Chemical Corporation, Dover Ohio, U.S.A.

Testing Methods

Density

Ethylene interpolymer product densities were determined using ASTM D792-13 (Nov. 1, 2013).

Gel Permeation Chromatography (GPC)

Ethylene interpolymer product molecular weights, $M_n$, $M_w$ and $M_z$, as well the as the polydispersity ($M_w/M_n$), were determined using ASTM D6474-12 (Dec. 15, 2012). This method illuminates the molecular weight distributions of ethylene interpolymer products by high temperature gel permeation chromatography (GPC). The method uses commercially available polystyrene standards to calibrate the GPC.

EXAMPLES

Example 1 (Comparative)

Operation of a Non-Adiabatic Reactor

Figure 2:
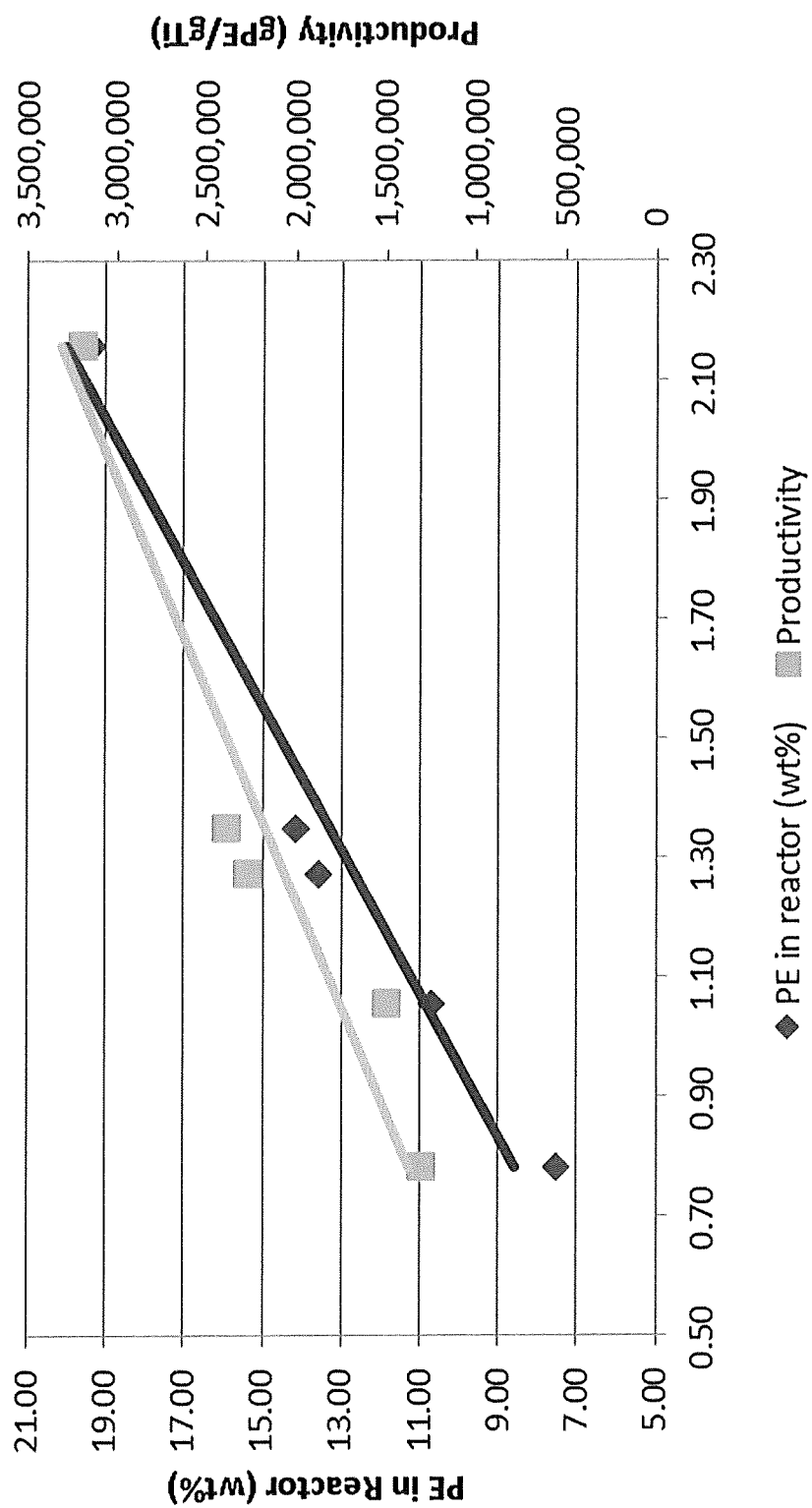
FIG. 2 is a graph of polymer concentration and catalyst productivity versus ethylene concentration (non inventive).
Figure 3:
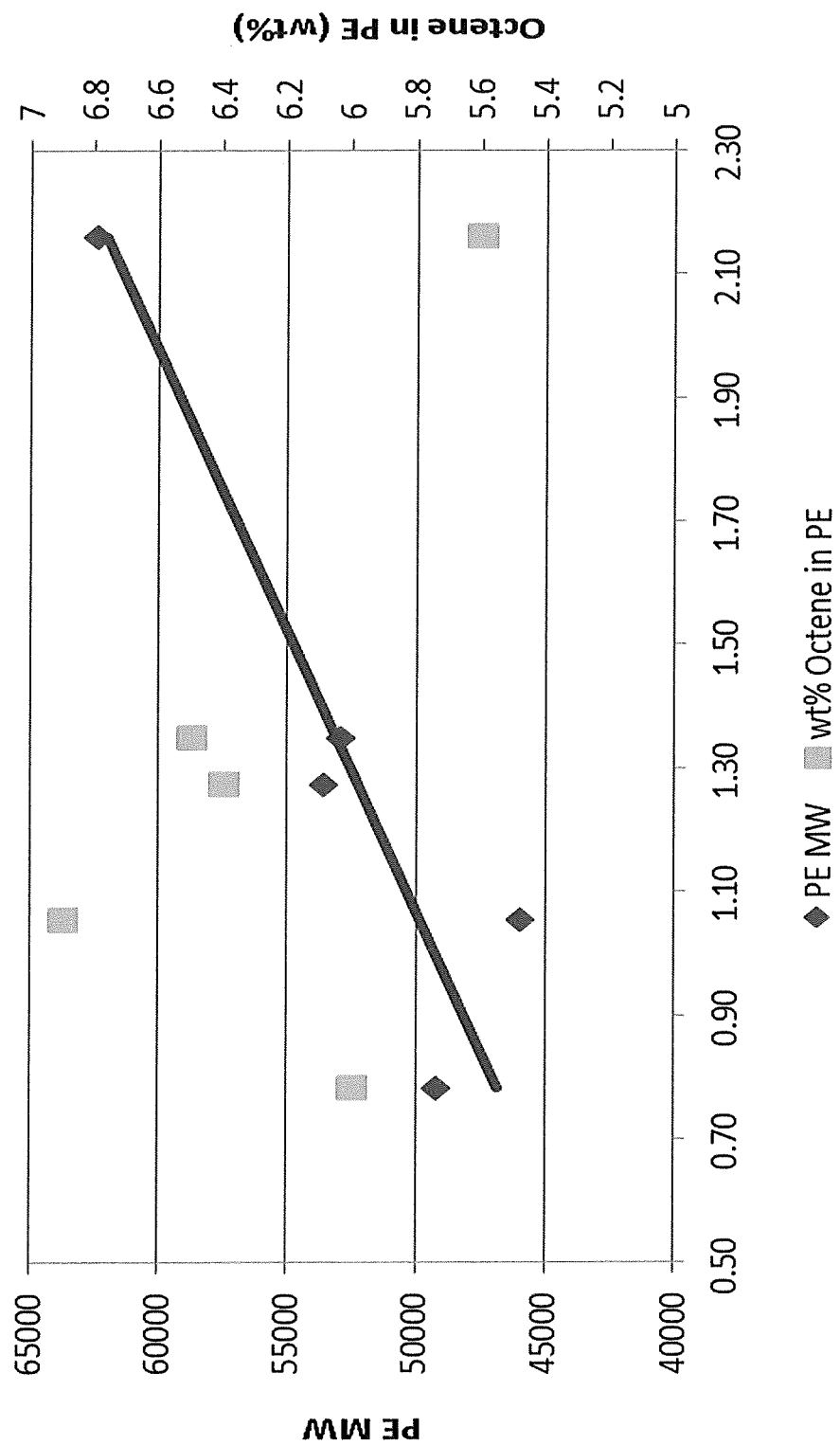
FIG. 3 is a graph of weight average molecular weight Mw and octene incorporation versus ethylene concentration (non inventive).

The polymerization reactor used in this example can be heated or cooled. The experiments of this example were conducted at a controlled temperature of 190° C. The polymerization was an ethylene/1-octene copolymerization. The catalyst concentration was adjusted to convert 90% of the ethylene that was added to the reactor. FIG. 2 shows a plot of the Polymer concentration as a function of the ethylene concentration in the reactor. As shown in FIG. 1, the reactor is operated in a near-adiabatic way when the ethylene concentration in the reactor is 1.3 weight % (wt %). At ethylene concentrations lower than 1.3 wt %, heat was added to the reactor to maintain the reactor temperature. Conversely, at concentrations higher than 1.3%, the reactor was cooled. The data in FIG. 2 show that operating with a cooled reactor produces higher polymer concentrations. In addition, the catalyst productivity in the cooled reactor almost doubled when compared to the adiabatic case.

TABLE 1

| RUN | | 2-3423-2 | 2-3432-2 | 2-3432-3 | 2-3423-6 |
|---|---|---|---|---|---|
| Catalyst | Catalyst | 0.6 | 0.76 | 0.66 | 0.73 |
| Concentration | Co-catalyst 1 | 0.0288 | 0.0288 | 0.0288 | 0.0288 |
| (mmol/L) | Co-catalyst 2 | 1.35 | 1.35 | 1.35 | 1.35 |
| | Co-catalyst 3 | 0.405 | 0.405 | 0.405 | 0.405 |
| Catalyst flows | Catalyst | | | | |
| (ml/min) | Co-catalyst 1 | 0.6 | 0.76 | 0.66 | 0.73 |
| | Co-catalyst 2 | 0.86 | 1.08 | 0.95 | 1.05 |
| | Co-catalyst 3 | 0.86 | 1.08 | 0.95 | 1.05 |
| Total flow (ml/min) | | 15.00 | 15.00 | 15.00 | 15.00 |
| Hold-up time (min) | | 4.7 | 4.7 | 4.7 | 4.7 |
| 1-Octene to ethylene | | 0.50 | 0.50 | 0.50 | 0.50 |
| Catalyst Productivity | g polymer/gTi | 1,306,507 | 1,501,584 | 2,276,986 | 3,197,921 |
| Ethylene conversion | (%) | 90.1 | 90.4 | 90.9 | 89.4 |
| Temperature | (° C.) | 190 | 190 | 190 | 190 |
| Ethylene feed | g/min | 1.00 | 1.45 | 1.90 | 3.00 |
| Ethylene concentration in feed | wt % | 7.87 | 11.03 | 13.97 | 20.41 |
| Ethylene concentration in Reactor | wt % | 0.78 | 1.05 | 1.27 | 2.16 |
| polymer concentration in solution | wt % | 7.55 | 10.71 | 13.57 | 19.33 |
| wt % octene | | | | 6.4 | 5.6 |
| GPC data | Mw | 49203 | 45998 | 53595 | 62408 |

Catalyst components:
Catalyst = cyclopentadienyl(tri-tert-butylphosphinimine)titanium dichloride = $Cp(^tBu_3PN)TiCl_2$
Co-catalyst 1: trityl tetrakis(pentafluorophenyl)borate = $[Ph_3C][(C_6F_5)_4B]$
Co-catalyst 2: modified methylaluminoxane
Co-catalyst 3: 2,6-di-tert-butyl-4-ethyl-phenol or butylated hydroxyethyl benzene = $2,6-^tBu_2-4-Et-C_6H_2OH$ Cooling the reactor can also provide product benefits. For example, increasing the ethylene concentration when operating at fixed conversion provides an increase in molecular weight. FIG. 2 shows a plot of the polymer molecular weight versus the ethylene concentration for the experiments in FIG. 1.

Example 2

Stirred Reactor Followed by Adiabatic Tubular Reactor (Trimmer and Afterburner Modes) (Inventive)

Two reactors are used in the experiments of this example. The first reactor is a stirred reactor that is equipped with an external heat exchanger in the form of a simple external jacket. The heat exchanger may be used to remove heat from the reactor. The second reactor is an adiabatic tubular reactor—i.e. a simple plug flow reactor that is not equipped with a heat exchanger. The adiabatic tubular reactor is located downstream of the stirred reactor and received the polymer solution that is discharged from the stirred reactor. The adiabatic tubular reactor was operated in two modes: long trimmer (LTRIM) and afterburner (AFT). In the LTRIM mode, no catalyst and monomer is added to the tubular reactor, polymerization continued because the catalyst from the first reactor was still active and because the solution contained monomer. In the AFT mode, monomer is added to the tubular reactor.

Comparative experiments were conducted in which the stirred reactor was operated in an adiabatic and non-adiabatic manner. Operating conditions for the reactor are shown in Table 2. In the first experiment (2a), the first reactor was operated in an adiabatic way. The steam jacket temperature offset was set to achieve the adiabatic reactor temperature in the first reactor based on a heat and mass balance calculation. The outlet of the first reactor flows in the second reactor (adiabatic tubular reactor), which is operated in long trimmer mode (LTRIM). Table 2 indicate the benefit of using the adiabatic tubular reactor after the first reactor from the same experiment. When the adiabatic reactor is excluded from rate and exit temperature, it shows that the temperature exiting the reactor is 180° C., with a rate of 72.8 kg/hr and a polymer concentration of 12.8%. Including the adiabatic tubular reactor downstream of the first reactor enables further reaction which further increases the polymer solution temperature to 193° C., as well as providing an increase in the polymer concentration in the solution.

A second experiment was then undertaken in which heat was removed from the first reactor. As shown in Table 2, this allowed an increase in the ethylene flow (and concentration) in the first reactor while maintaining the temperature. Higher ethlyene flow in the first reactor also results in an increased outlet temperature for the tubular reactor (193° C. to 197° C.). Operating the first reactor in a non-adiabatic way resulted in an increase in polymer rate (78.6 to 84.5) and polymer concentration (12.9 to 13.9 wt %).

As shown in Table 2, the temperature of the product discharge (from the tubular reactor) was about 192° C. for the first experiment which used an adiabatic stirred reactor. Table 2 also shows that the discharge temperature for the second experiment further increased to about 196° C., which is a desirable result because the higher discharge temperature means that less energy is required to separate the polyethylene product from the polymer solution.

A third experiment (2c) was run with R1 operated in non-adiabatic mode and the tubular reactor was run in afterburner mode (ethylene was added to the tubular reactor). This experiment shows the benefits of operating the first reactor in non-adiabatic way and a second reactor in an adiabatic way. The combination of the non-adiabatic reactor with adiabatic plug flow reactor (afterburner mode) enables an increase in the polymer solution temperature to 219° C. and a polymer concentration to 15.8 wt %. The experiments run in example 2 shows how combining a non-adiabatic reactor with an adiabatic reactor can provide high polymer concentrations and high reaction outlet temperatures. Using this configuration of reactors, the process conditions can to be adjusted to optimize polymer rate, resin architecture and lower operating cost.

TABLE 2

Comparison of process conditions for an adiabatic and non-adiabatic stirred reactor followed by adiabatic tubular reactor.

| | | Reactor Mode | | |
|---|---|---|---|---|
| | | 2a | 2b | 2c |
| | | R1 | | |
| | | adiabatic | adiabatic | non-adiabatic | non-adiabatic |
| | | | R2 | | |
| | | LTRIM (excluded) | LTRIM adiabatic | LTRIM adiabatic | AFT adiabatic |
| Total Flow | kg/hr | 610 | 610 | 610 | 600 |
| R1 Flow | kg/hr | 570 | 570 | 570 | 518 |
| Ethylene flow R1 | kg/hr | 71 | 71 | 77 | 72 |
| Ethylene flow R2 | kg/hr | 0 | 0 | 0 | 18 |
| Octene flow R1 | kg/hr | 44.0 | 44.0 | 47.3 | 46.2 |
| Reactor 1 outlet temperature | ° C. | 180 | 180 | 180 | 182 |
| R1 Exchanger jacket offset Temperature | ° C. | 1 | 1 | −25 | −26 |
| Reactor 2 outlet temperature | ° C. | N/A | 193 | 197 | 219 |
| R1 conversion | % | 89.7 | 89.7 | 89.8 | 89.9 |
| Total conversion | % | 89.7 | 97.9 | 97.7 | 94.5 |
| Polymer rate | kg/hr | 72.8 | 78.6 | 84.5 | 94.7 |
| Polymer concentration | wt % | 12.8% | 12.9% | 13.9% | 15.8% |

N/A = not applicable

Example 3

Dual Non-Adiabatic Stirred Reactor Followed by Adiabatic Tubular Reactor (Long Trimmer Mode), Dual Catalyst System Three reactors were used in the experiments of this example. The first two were stirred reactors in series with each reactor having an external heat exchange jacket. The third reactor (downsteam of the second stirred reactor) was a tubular adiabatic reactor—again, a simple plug flow reactor that is not equipped with a heat exchanger. The contents from the second reactor flow into the third reactor.

Different catalyst system were fed to the first and second stirred reactor. A single site catalyst was fed to the first reactor and a Zeigler Natta catalyst was fed to the second reactor.

The first experiment was conducted the first reactor being operated in a non-adiabatic mode, the second reactor was operated in adiabatic mode and the third reactor operating in an adiabatic trimmer mode. A second experiment was conducted in which the second reactor was also cooled, and the third reactor operating in an adiabatic trimmer mode.

As shown in Table 3, decreasing the R2 exchanger temperature allowed an increase in the ethylene feed flow, which resulted in an increase in polymer concentration and further increase in reaction outlet temperature (220° C.).

TABLE 3

|  |  | R1 | |
| --- | --- | --- | --- |
|  |  | non-adiabatic | non-adiabatic |
|  |  | R2 | |
|  |  | adiabatic | non-adiabatic |
|  |  | R3 | |
|  |  | adiabatic 3a | adiabatic 3b |
| Total Flow | kg/hr | 551 | 551 |
| Ethylene flow R1 | kg/hr | 71 | 71 |
| Ethylene flow R2 | kg/hr | 0 | 0 |
| Octene flow R1 | kg/hr | 44.0 | 44.0 |
| Reactor 1 temperature | ° C. | 146.2 | 145.8 |
| Reactor 2 temperature | ° C. | 215.0 | 215.1 |
| LTRIM outlet temperature | ° C. | 219.5 | 221.9 |
| R1 Exchanger jacket offset Temperature | ° C. | −17 | −16 |
| R2 Exchanger jacket offset Temperature | ° C. | 17 | −3 |
| R1 conversion | % | 80.2 | 79.9 |
| R2 conversion | % | 52.3 | 55.6 |
| R3 conversion | % | 93.6 | 94.0 |
| Total conversion | % | 89.7 | 97.9 |
| Polymer rate | kg/hr | 94.5 | 99.7 |
| Polymer concentration | wt % | 17.2% | 18.1% |

Example 4

Dual Non-Adiabatic Stirred Reactor Followed by Adiabatic Tubular Reactor (Dual Catalyst System—with Second Catalyst Injected in Last Two Reactors This example is based on a process simulation of a three reactors system where the first two were mixed reactors in series with cooling capability and the third reactor (downsteam of the second stirred reactor) was an adiabatic tubular reactor. The contents from the second reactor flow into the third reactor. The reactor model uses kinetic parameters for the two different catalyst described in Example 3.

For these simulations, a single site catalyst was fed to the first stirred reactor. A Zeigler Natta catalyst was fed in the second stirred reactor. In one of the simulation (Example 4d) a Zeigler Natta catalyst was also fed in the third reactor.

Four reactor simulations were run to demonstrate possible operating modes: The first simulation (Example 4a) was conducted with all reactors being operated in adiabatic mode and R3 was operated in the Long trimmer mode (i.e. no monomer and catalyst feed). In Example 4b, the first reactor was simulated in non-adiabatic mode, the second reactor were simulated in an non-adiabatic mode. The third reactor (adiabatic tubular reactor) was simulated in long trimmer mode (no additional feeds). In Example 4c the first two reactors were simulated in non-adiabatic mode and the third reactor was simulated as an adiabatic reactor. Example 4d is a simulation where R1 and R2 are run in non-adiabatic mode and R3 is an adiabatic tubular reactor fed with additional catalyst and monomer. The process conditions were adjusted to target the same polymer architecture (molecular weight and branch content). The total flow through the reactor system was maintained constant. The conversion in R1 and R2 were also constant. R3 conversion depends on how much live catalyst is fed to the reactor (live catalyst exiting R2 and fresh catalyst addition to R3).

Table 4 shows the results of the simulation. Example 4a shows a comparative scenario where all reactor are operated in an adiabatic way. This represent a base case with the lowest polymer rate, lower outlet temperature. Example 4a shows that adding a an adiabatic tubular reactor downstream of R2, increases the reaction outlet temperature by 11° C. This is desirable because higher reaction outlet temperature decrease the amount of energy input required in the polymer devolatization stage.

Example 4b and 4c shows what happens when cooling is added to one or both mixed reactors (R1 & R2). Increasing cooling allows the reactors to operate at higher ethylene concentration while operating at the same reactor temperature (maintaining conditions to achieve target product). The hydrogen concentration was also adjusted to maintain the same molecular weight due to higher ethylene concentration. Operating R1 and/or R2 in a non-adiabatic way, enables polymer concentration and production rate to be increased significantly and a higher ethylene concentration produced higher catalyst productivity. Increasing the overall ethylene concentration from 15.9 to 20% improved catalyst productivity by 28%. The outlet temperature form the adiabatic plug flow reactor also increased due to a higher amount of ethylene exiting R2. Combining the non-adiabatic reactor with an adiabatic reactor enables polymer rate and polymer concentration to be increased, while the adiabatic reactors increase the reaction system exit temperature prior the polymer devolatization stage.

Adding a small amount of ethylene and catalyst to the adiabatic tubular reactor produces a higher exit temperature. Example 4d shows an example where 10% of the total ethylene flow was added in R3 with additional catalyst feed. The process conditions were adjusted to maintain the same polymer architecture. The addition of ethylene and catalyst to the adiabatic tubular reactor leads to a significant gain in reaction exit temperature (242° C. vs 229° C. in example 4c). Higher production rates were also achieved. However, the catalyst productivity was decreased slightly due to the high operating temperature of R3.

TABLE 4

|  |  | Example 4a | Example 4b | Example 4c | Example 4d |
| --- | --- | --- | --- | --- | --- |
| R1 operating mode |  | adiabatic | non-adiabatic | non-adiabatic | non-adiabatic |
| R2 operating mode |  | adiabatic | adiabatic | non-adiabatic | non-adiabatic |
| R3 operating mode |  | adiabatic | adiabatic | adiabatic | adiabatic |
| Total Flow | kg/hr | 550 | 550 | 550 | 550 |

TABLE 4-continued

| | | Example 4a | Example 4b | Example 4c | Example 4d |
|---|---|---|---|---|---|
| R1 ethylene concentration | wt % | 11.3% | 15.0% | 13.8% | 13.8% |
| R2 ethylene concentration | % | 15.9% | 18.0% | 20.0% | 20.0% |
| Overall ethylene concentration | % | 15.9% | 18.0% | 20.0% | 20.9% |
| R1 total flow | kg/hr | 310 | 264 | 319 | 333 |
| R2 total flow | kg/hr | 550.0 | 550.0 | 550.0 | 517.2 |
| R3 total flow | kg/hr | 550.0 | 550.0 | 550.0 | 550.0 |
| 1-octene flow R1 | kg/hr | 36.9 | 41.7 | 46.4 | 46.0 |
| 1-octene flow R2 | kg/hr | 0 | 0 | 0 | 0 |
| 1-octene flow R3 | kg/hr | 0 | 0 | 0 | 0 |
| R1 ethylene split | % | 40% | 40% | 40% | 40% |
| R2 ethylene split | % | 60% | 60% | 60% | 50% |
| R3 ethylene split | % | 0% | 0% | 0% | 10% |
| Ethylene flow R1 | kg/hr | 35.0 | 39.6 | 44.00 | 46.0 |
| Ethylene flow R2 | kg/hr | 52.5 | 59.4 | 66 | 57.5 |
| Ethylene flow R3 | kg/hr | 0 | 0 | 0 | 11.5 |
| Hydrogen R1 | pmm | 0.5 | 1.1 | 0.9 | 1 |
| Hydrogen R2 | ppm | 1 | 1 | 2 | 1.3 |
| Hydrogen R3 | ppm | 0 | 0 | 0 | 0 |
| Cat 1 flow R1 | kg/hr | 3.79E−05 | 2.54E−05 | 3.46E−05 | 3.68E−05 |
| Cat 2 flow R2 | kg/hr | 2.19E−03 | 2.21E−03 | 2.15E−03 | 2.09E−03 |
| Cat 2 flow R3 | kg/hr | 0.00E+00 | 0.00E+00 | 0.00E+00 | 3.85E−04 |
| Total catalyst flow | kg/hr | 2.23E−03 | 2.23E−03 | 2.18E−03 | 2.51E−03 |
| R1 conversion | % | 81.5 | 81.5 | 81.5 | 81.5 |
| R2 conversion | % | 80.5 | 80.5 | 80.5 | 80.5 |
| R3 conversion | % | 36.1 | 40.8 | 40.5 | 59.8 |
| Reactor 1 temperature | °C. | 145.0 | 144.4 | 144.4 | 145.7 |
| Reactor 2 temperature | °C. | 215.0 | 217.0 | 214.0 | 215.0 |
| R3 outlet temperature | °C. | 226.0 | 230.0 | 228.6 | 242.0 |
| Cooling duty R1 | kW | 0.0 | 9.0 | 8.0 | 8.0 |
| Cooling duty R2 | kW | 0.0 | 0.0 | 11.5 | 11.0 |
| Total FE conversion | % | 91.6 | 92.2 | 92.2 | 91.5 |
| Polymer rate | kg/hr | 86.8 | 98.2 | 109 | 113.2 |
| Polymer concentration | wt % | 15.8 | 17.9 | 19.8 | 20.6 |
| Catalyst productivity | kg/kg | 38878 | 43997 | 50006 | 45031 |
| MI | | 0.7 | 0.7 | 0.6 | 0.7 |
| density | | 0.923 | 0.923 | 0.923 | 0.923 |
| Branching frequency | | 9.3 | 9.3 | 9.2 | 9.4 |
| MW | | 108358 | 109928 | 112332 | 108009 |

Example 5

Dual Non-Adiabatic Stirred Reactor Followed by Adiabatic Tubular Reactor (Dual Catalyst System—with Second Catalyst Injected in Last Two Reactors)

This example uses the same simulation tools as described in Example 4. For these simulations, a single site catalyst was fed to the first stirred reactor. A Zeigler Natta catalyst was fed in the second stirred reactor. In one of the simulation (Example 5d) a Zeigler Natta catalyst was also fed in the third reactor.

Operating at higher ethylene concentration with non-adiabatic reactors can result in higher ethylene concentration and flow leaving the reactor system. This is not desirable because of the higher cost required to separate and recycle the ethylene. One option to adress this issue is to increase the ethylene conversion across the reaction train to reduce the amount of ethylene leaving the reactor system.

Four reactor simulations were run to demonstrate how the reactor conversions can be manipulated to reduce ethylene concentration and flow out of the reactor system. The process conditions were adjusted to target the same polymer architecture (molecular weight and branch content). The total flow through the reactor system was maintained constant. The conversion in R2 and R3 were manipulated to reduce the amount of ethylene leaving Reaction.

The first (comparative) simulation (Example 5a) was conducted with all reactors being operated in adiabatic mode and R3 was operated in the Long trimmer mode (i.e. no monomer and catalyst feed). This simulation represents a base case for an acceptable amount of ethylene leaving reaction. In Example 5b and 5c, the first and second reactors were simulated in an non-adiabatic mode. The third reactor (adiabatic tubular reactor) was simulated in long trimmer mode (no additional feeds). In Example 5c, the Reactor 2 ethylene conversion was increased to reduce the ethylene flow leaving the reactors to the same ethylene exit flow as comparative example 5a. Example 5d is a simulation where R1 and R2 are run in non-adiabatic mode and R3 is an adiabatic tubular reactor fed with additional catalyst to increase Reactor 3 conversion and thus reduce the ethylene flow leaving the reactor system to match Example 5a.

Table 5 shows the results of the simulations. Example 5a represents the base case with adiabatic reactors. The ethylene concentration leaving reaction is 7.4 kg/hr and the R3 outlet temperature is 226° C., the production rate is 86.8 kg/hr and the catalyst productivity is 38878 kg/kg.

Example 5b shows that increasing cooling allows the reactors to operate at higher ethylene concentration while operating at the same reactor temperature (maintaining conditions to achieve target product). The conversion were the same as per example 5a. Higher ethylene concentration in the feed enabled higher production rate and catalyst productivity relative to Example 5a. In this case, the production rate increased to 109 kg/hr, the catalyst productivity increased to 50006 kg/kg and the R3 outlet temperature also increased to 228.4° C. However, maintaining the same reactor conversion resulted in higher ethylene flow leaving the reactor system (8.6 kg/hr instead of 7.4 kg/hr) which is not desirable.

In Example 5c, the Reactor 2 ethylene conversion was increased so that the amount of ethylene leaving Reactor 3 would match that of Example 5a. The reactor 2 temperature was maintained constant by increasing cooling. Hydrogen and octene were adjusted to make the same polymer. Increasing the Reactor 2 conversion resulted in higher polymer production, with the production rate increased to 110.3 kg/hr. However, the catalyst productivity was reduced to 43933 kg/kg.

Example 5d shows a more efficient way of increasing the overall conversion to reduce the amount of ethylene leaving the reactor system. In this example, the R1 and R2 conversion were set the same as per Example 5a. A small amount of catalyst was added to the adiabatic tubular reactor to increase the R3 conversion and reduce the amount of ethylene leaving the reactor system. The other conditions (hydrogen and octene) were adjusted to maintain the same polymer architecture. Adding catalyst to R3 resulted in the most desirable outcome: the R3 outlet ethylene flow was reduced to 7.4 kg/hr, the R3 outlet temperature increased to 231° C., the production rate was maintained (same as 5c) and the catalyst productivity increased to 47751 kg/kg. The addition of catalyst to the adiabatic tubular reactor also lead to a gain in reaction exit temperature (231° C. vs 228.6° C. in example 5c). Example 5d shows that adding catalyst to the adiabatic tubular reactor is a more effective way to reduce ethylene concentration leaving the reactor system, while maintainning production rate and increasing reactor system outlet temperature.

TABLE 5

|  |  | Example 5a | Example 5b | Example 5c | Example 5d |
| --- | --- | --- | --- | --- | --- |
| R1 operating mode |  | adiabatic | non-adiabatic | non-adiabatic | non-adiabatic |
| R2 operating mode |  | adiabatic | non-adiabatic | non-adiabatic | non-adiabatic |
| R3 operating mode |  | adiabatic | adiabatic | adiabatic | adiabatic |
| Total Flow | kg/hr | 550 | 550 | 550 | 550 |
| R1 ethylene concentration | wt % | 11.3% | 13.8% | 13.8% | 13.8% |
| R2 ethylene concentration | % | 15.9% | 20.0% | 20.0% | 20.0% |
| Overall ethylene concentration | % | 15.9% | 35.0% | 20.0% | 20.0% |
| R1 total flow | kg/hr | 310 | 319 | 319 | 319 |
| R2 total flow | kg/hr | 550.0 | 550.0 | 550.0 | 550.0 |
| R3 total flow | kg/hr | 550.0 | 550.0 | 550.0 | 550.0 |
| 1-octene flow R1 | kg/hr | 36.9 | 46.4 | 43.6 | 46.4 |
| 1-octene flow R2 | kg/hr | 0 | 0 | 0 | 0 |
| 1-octene flow R3 | kg/hr | 0 | 0 | 0 | 0 |
| R1 ethylene split | % | 40% | 40% | 40% | 40% |
| R2 ethylene split | % | 60% | 60% | 60% | 60% |
| R3 ethylene split | % | 0% | 0% | 0% | 0% |
| Ethylene flow R1 | kg/hr | 35.0 | 44.0 | 44.00 | 44.0 |
| Ethylene flow R2 | kg/hr | 52.5 | 66.0 | 66 | 66.0 |
| Ethylene flow R3 | kg/hr | 0 | 0 | 0 | 0.0 |
| Hydrogen R1 | pmm | 0.5 | 0.9 | 0.9 | 0.9 |
| Hydrogen R2 | ppm | 1 | 2 | 1.4 | 2 |
| Hydrogen R3 | ppm | 0 | 0 | 0 | 0 |
| Cat 1 flow R1 | kg/hr | 3.79E−05 | 3.46E−05 | 3.32E−05 | 3.46E−05 |
| Cat 2 flow R2 | kg/hr | 2.19E−03 | 2.15E−03 | 2.48E−03 | 2.13E−03 |
| Cat 2 flow R3 | kg/hr | 0.00E+00 | 0.00E+00 | 0.00E+00 | 1.43E−04 |
| Total catalyst flow | kg/hr | 2.23E−03 | 2.18E−03 | 2.51E−03 | 2.31E−03 |
| R1 conversion | % | 81.5 | 81.5 | 81.5 | 81.5 |
| R2 conversion | % | 80.5 | 80.5 | 82.6 | 80.5 |
| R3 conversion | % | 36.1 | 40.5 | 43.4 | 48.8 |
| Reactor 1 temperature | ° C. | 145.0 | 144.4 | 144.4 | 144.4 |
| Reactor 2 temperature | ° C. | 215.0 | 214.0 | 215.0 | 214.0 |
| R3 outlet temperature | ° C. | 226.0 | 228.4 | 228.6 | 231.0 |
| Cooling duty R1 | kW | 0.0 | 8.0 | 8.0 | 8.0 |
| Cooling duty R2 | kW | 0.0 | 11.5 | 12.5 | 11.5 |
| Total FE conversion | % | 91.6 | 92.2 | 93.4 | 93.3 |
| Reactor 3 outlet ethylene flow | kg/hr | 7.4 | 8.6 | 7.3 | 7.4 |
| Polymer rate | kg/hr | 86.8 | 109.0 | 110.3 | 110.4 |
| Polymer concentration | wt % | 15.8 | 19.8 | 20.1 | 20.1 |

TABLE 5-continued

|  |  | Example 5a | Example 5b | Example 5c | Example 5d |
|---|---|---|---|---|---|
| Catalyst productivity | kg/kg | 38878 | 50006 | 43933 | 47751 |
| MI |  | 0.7 | 0.6 | 0.6 | 0.7 |
| density |  | 0.923 | 0.923 | 0.923 | 0.923 |
| Branching frequency |  | 9.3 | 9.2 | 9.1 | 9.3 |
| MW |  | 108358 | 112332 | 112039 | 111435 |

What is claimed is:

1. A multistage process for the solution polymerization of ethylene, said process comprising
I) a first stage polymerization conducted in at least one non adiabatic and mixed reactor in the presence of a first catalyst system; and
II) a second stage polymerization conducted in at least one adiabatic reactor and in the presence of a second catalyst system that is different from said first catalyst system.

2. The process of claim 1 wherein said at least one adiabatic reactor comprises a tubular reactor.

3. The process of claim 2 wherein said second catalyst system comprises a Zeigler Natta catalyst system.

4. The process of claim 1 wherein said first stage polymerization conducted in at least one non adiabatic and mixed reactor and said second stage polymerization conducted in at least one adiabatic reactor are operated in series mode.

5. The process of claim 1 wherein said first catalyst system comprises a single site catalyst system and said second catalyst system comprises a Zeigler Natta catalyst system.

6. The process of claim 1 wherein ethylene and at least one C3 to C8 alpha olefin are copolymerized.

7. The process of claim 6 wherein said at least one C3 to C8 alpha olefin comprises 1-octene.

8. The process of claim 1 wherein said first catalyst system comprises a single site catalyst system.

9. The process of claim 1 wherein said first catalyst system comprises a single site catalyst system comprising an ionic activator (component (iii)), a bulky ligand-metal complex (component (i)), an alumoxane co-catalyst (component (ii)) and an optional hindered phenol (component (iv)).

10. The process of claim 1 wherein said first catalyst system comprises a boron activator.

11. The process of claim 1 wherein said first catalyst system comprises a single site catalyst system comprising an ionic activator (component (iii)), a bulky ligand-metal complex (component (i)), an alumoxane co-catalyst (component (ii)) and an optional hindered phenol (component (iv)); and said second catalyst system comprises a Zeigler Natta catalyst system.

12. The process of claim 1 wherein said first catalyst system comprises a single site catalyst system and a boron activator; and said second catalyst system comprises a Zeigler Natta catalyst system.

13. The process of claim 1 wherein said first stage polymerization is conducted in one cooled mixed loop reactor.

14. The process of claim 1 wherein said first stage polymerization is conducted in two cooled mixed loop reactors with the further proviso that said second stage polymerization is conducted in the presence of polymer solutions which are discharged from both of said two cooled loop reactors.

15. The process of claim 1 wherein said second stage polymerization is conducted in a stirred reactor that is immediately downstream of said first stage and a tubular reactor that is downstream of said stirred reactor.

* * * * *